United States Patent [19]

Chism, Jr.

[11] Patent Number: 4,682,235
[45] Date of Patent: Jul. 21, 1987

[54] ORTHO-LINEAR IMAGING DEVICE

[75] Inventor: Samuel B. Chism, Jr., Houston, Tex.

[73] Assignee: Ford Aerospace & Communications Corporation, Detroit, Mich.

[21] Appl. No.: 789,055

[22] Filed: Oct. 18, 1985

[51] Int. Cl.$^4$ .............................................. H04N 3/12
[52] U.S. Cl. ..................................... 358/212; 358/54; 358/214; 250/578
[58] Field of Search ................. 358/213, 212, 214, 41, 358/54; 250/578; 350/356, 357

[56] References Cited

U.S. PATENT DOCUMENTS

| | | | |
|---|---|---|---|
| 1,976,377 | 10/1934 | vonBronk | 358/199 |
| 3,803,353 | 4/1974 | Sanderson et al. | 358/213 |
| 4,371,892 | 2/1983 | Mir | 358/75 |
| 4,446,479 | 5/1984 | Kurtz | 358/75 |

*Primary Examiner*—L. T. Hix
*Assistant Examiner*—David M. Gray
*Attorney, Agent, or Firm*—Edward J. Radlo; Keith L. Zerschling

[57] ABSTRACT

A two-dimensional image (1) is converted into an electronic signal (7). Image line segments (11) into which the image (1) has been divided are selectively projected onto a cylindrical image lens (4) and focused onto a linear array (5) of N photodetectors (15). A light modulator (3), a linear array of electro-optic shutter elements (13) arranged orthogonally to the photodetector array (5), is positioned between the image (1) and the image lens (4), and permits one of the image line segments (11) to be so projected while blocking the other segments (11). An object lens (2), a second cylindrical lens, focuses the image line segments (11) onto the light modulator (3). An electronic control circuit (6) accepts the electronic outputs (42) of the photodetectors (15) in synchronism with the sequential opening of the electro-optic shutter elements (13) corresponding to the image line segment (11) being converted. Three parallel detector arrays (5) can be used in a color imaging system. Each photodetector (15) may be a matrix of detector elements, to enable real-time digital image enhancement.

10 Claims, 3 Drawing Figures

ORTHO-LINEAR IMAGING DEVICEDESCRIPTION

TECHNICAL FIELD

This invention pertains to the field of converting a two-dimensional image to electronic data representative of the information content of the image.

BACKGROUND ART

U.S. Pat. No. 1,976,377 discloses a device for converting video data to electronic data, which differs from the present invention in that: (1) the object being imaged must be a film transparency; (2) the film transparency must be inserted between cylindrical lenses; (3) a single output detector is used, rather than an array of detectors; (4) the film transparency must be physically moved to scan a new line within each frame; and (5) the illumination must be provided by a complex set of sequentially lit glow lamps, not unscanned ambient light or a single light source as in the present invention.

U.S. Pat. No. 3,803,353 is an improvement to U.S. Pat. No. 1,976,377 in that the use of a linear detector array obviates the necessity for film motion for scan line selection within a frame. However, the reference device differs from the present invention in that: (1) the object to be imaged must be a film transparency; (2) the film transparency must be positioned between two cylindrical lenses; (3) a complex linear array of discrete light sources or a scanning light source is used for line segment selection, rather than ambient light or a single light source; (4) spherical lenses are used; and (5) the imaged data is detected point-by-point, whereas in the present invention, it is detected line-by-line, increasing speed and decreasing complexity.

U.S. Pat. No. 4,371,892 is a device for converting electronic data to a two-dimensional image, not a device for converting a two-dimensional image to electronic data as in the present invention.

U.S. Pat. No. 4,446,479 is similar to U.S. Pat. No. 4,371,892 in that it uses a linear array birefringent light valve to convert electronic image data to a physically transported two-dimensional output.

DISCLOSURE OF INVENTION

The present invention is a device for converting a two-dimensional image (1) into an analog or digital electronic signal (7). The image (1) is divided into a set of substantially identical image line segments (11). A cylindrical object lens (2) focuses light from each image line segment (11) onto a light modulator (3). The light modulator (3) selectively illuminates an image lens (4) with light from just one of the image line segments (11) at a time. The image lens (4) is disposed to focus light from each image line segment (11) onto a generally linear array (5) of N photodetectors (15).

Each photodetector (15) converts light energy into an electrical signal (42). The photodetectors (15) can be photodiodes, phototransistors, charge coupled devices (CCD's), etc. When the photodetectors (15) are photodiodes, signals (42) outputted therefrom are typically converted by analog-to-digital converters (35) into digital form (7).

The light modulator (3) is a linear array of M electro-optic shutter elements (13) arranged orthogonally to the detector array (5). The shutter elements (13) can be LCD or magneto-optic elements (13), one of which is commanded by control circuit (6) to be transparent, and the other M-1 elements (13) of which are commanded by control circuit (6) to be opaque to the light received from the image (1). By this means, the light modulator (3) acts as an electronic shutter, allowing just one of the image line segments (11) to pass at any one time.

In case the image (1) is a film transparency, the back of the film transparency is illuminated by a light source (20) situated on the side of the image (1) remote from the other components of the invention. If the image (1) is opaque, it is front-illuminated by ambient light or a uniform light source (19).

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
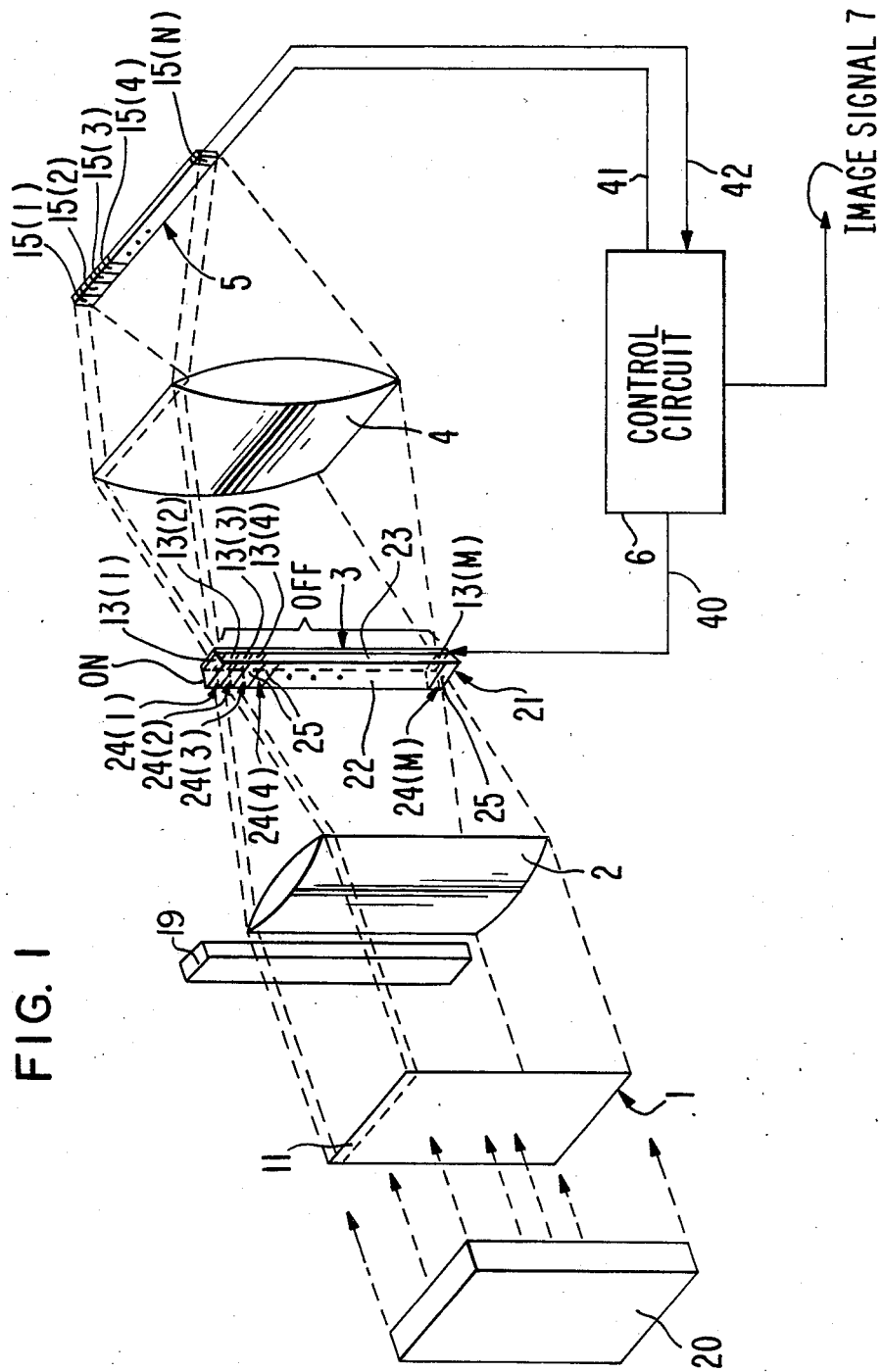
FIG. 1 is a partly schematic elevational view of a preferred embodiment of the present invention.

The image line segments 11 are imaginary segments into which the image 1 has been divided. Segments 11 are typically uniformly sized and parallel. FIG. 1 illustrates the uppermost image line segment 11, and light rays projected therefrom.

Object lens 2 is a cylindrical lens which focuses each image line segment 11 onto a focal line along which is aligned light modulator 3, as illustrated in FIG. 1. The left-to-right reverse of image line segment 11 is projected onto image lens 4.

Shutter 3 comprises M openable/closeable shutter elements 13, with each shutter element 13 corresponding to one image line segment 11. M is an integer having a value of at least several and is typically several hundred. The array 3 of shutter elements 13 is orthogonal to (in a separate parallel plane to) the array of photodetectors 15; hence the expression "ortho-linear imaging device".

Modulator 3 may be a single element linear array or one column/row of an LCD or magneto-optic matrix. A suitable LCD light modulator 3 is manufactured by UCE Inc. of Norwalk, Conn. In this light modulator 3, the "active" or "on" element 13 can be made either opaque or transparent. For this application, the active element 13 is made to be transparent. Each shutter element 13 is closed (made opaque) by means of crystal particles therein lining up in response to an electric field 40 introduced by shutter control 31 (see FIG. 2). The shutter element 13 is opened (made transparent) by means of shutter control 31 removing the electric field produced by signal 40, dispersing said crystals. Color can be distinguished through a filter, polarizer, or dichroic dye-colored fluids.

A suitable magneto-optic modulator 3 is the one bearing the trade name Light-Mod manufactured by the Data Systems Division of Litton Industries, Van Nuys, Calif. Light-Mod is fabricated from bismuth-substituted iron-garnet films grown on non-magnetic substrates. It typically consists of an array of 1- to 20-mil-square pixels 13. Just one column or row of the array is used for modulator 3. The pixels 13 form a waffle-like grid, with electric conductors positioned in a similar grid pattern between the pixels 13. This device 3 can be directly interfaced with a digital electronic shutter control 31. Light-Mod can be made with up to 200 pixels 13 per inch with a contrast ratio from 10:1 to 1000:1, depending upon illumination source 20 and the presence of any polarizers. From 9 to 81 gray-scale levels are possible, with no reduction in resolution, although in the particular application described herein, only "opaque" and "transparent" are used. Cycle time for changing the state of a single pixel 13 is less than 1 microsecond; the smaller the pixel, the faster the switching time. The power requirement, which is modest, is dependent upon the addressing sequence and the rate and size of the array 3. Since the device 3 is nonemissive, power is required only during the switching interval of the pixels 13.

When operating the device 3, the magnetic orientation of a pixel 13 is altered or switched by passing a small electric current through selected conductors 40 which cross adjacent to the pixel 13. This switching of the magnetic orientation affects the light passing through the selected pixel 13 using the Faraday effect. The effect causes the rotation of a plane-polarized light beam as it passes through the pixel's magnetic field.

Maintaining the drive-line current 40 until the pixel 13 becomes magnetically saturated allows the pixel 13 to remain in a magnetized state indefinitely: until it is magnetized in the opposite direction by the drive-line currents 40. This eliminates the need for periodic modulator 3 refresh signals, simplifies drive requirements, and results in very low power consumption and effective bandwidth compression during image scan line 11 selection.

In addition to the two stable states in which the magnetic field is uniform in one of two normal orientations, a third stable state is possible. In this state, 50% of the pixel 13 is magnetized in one direction, and 50% in the opposite direction in a random manner. This third state is the source of the gray scale.

Positioned on the object lens 2 side of shutter 3, and in close proximity thereto, is an array 21 of collimators 24, each of which allows light to enter one of the shutter elements 13 from one of the image line segments 11 while blocking light from the other image line segments 11. Each collimator 24 can be formed by any optical shaping means, such as upper and lower trapezoidally-shaped horizontal plates 25, and portions of left and right veritcal slats 22, 23, respectively, which are flared outwardly to correspond to the outer dimensions of lens 2.

Image lens 4 is also a cylindrical lens, but its principal axis is oriented orthogonal to that of lens 2. Shutter 3 intersects one of the focal lines of lens 4. Detector array 5 lies along lens 4's othe focal line. Thus, information from each image line segment 11 is focused onto array 5.

Lenses 2 and 4 can be Fresnel lenses, reducing cost, weight, and size, and facilitating mounting. Lens 4 can have a greater field of view (more distant focal line) on its detector arrray 5 side than on its shutter 3 side, making it possible to use larger and thus more convenient detector arrays 5.

Array 5 comprises a series of photodetectors 15, each of which outputs an electronic signal 42 in response to incident light radiation. Photodetectors 15 may be photodiodes, phototransistors, CCD's, etc. When photodetectors 15 are photodiodes, the output of each photodetector 15 is an analog signal 42 whose amplitude is proportional to the intensity of the incident light radiation. Thus, photodiodes 15 are suitable for recording several levels of gray scale. This analog signal 42 may be converted by an analog-to-digital converter in formatter 35, so that the image output signal 7 is in digital form suitable for processing or storage by a digital computer, facsimile, a digital video system such as a laser disk player, etc.

In lieu of a single detector array 5, three parallel arrays 5, all lying in the focal line of lens 4 and all being disposed to receive light from each image line segment 11, can be used. By use of filters positioned in front of the photodetectors 15, or by doping the photodetectors 15, a first array 5 can be made responsive to red light, a second array 5 can be made responsive to green light, and the third array 5 to blue light, thus enabling the digitization of color images. Alternatively, the three arrays 5 may be responsive to cyan, magenta, and yellow, enabling the digitization of color images using a subtractive color system.

A matrix of detector elements can be used in place of each photodetector 15. This permits real-time point-by-point image processing, e.g., smoothing, sharpening, or other computerized techniques, by formatter 35 to enhance the digitized image. For example, each photodetector 15 can comprise a three by three matrix of detector elements forming nine pixels. The output 42 of the center pixel can be redefined to be, e.g., the magnitude of the signal from the center pixel minus the average of the magnitudes of the signals from the surrounding eight pixels, said average divided by a constant.

Figure 2:
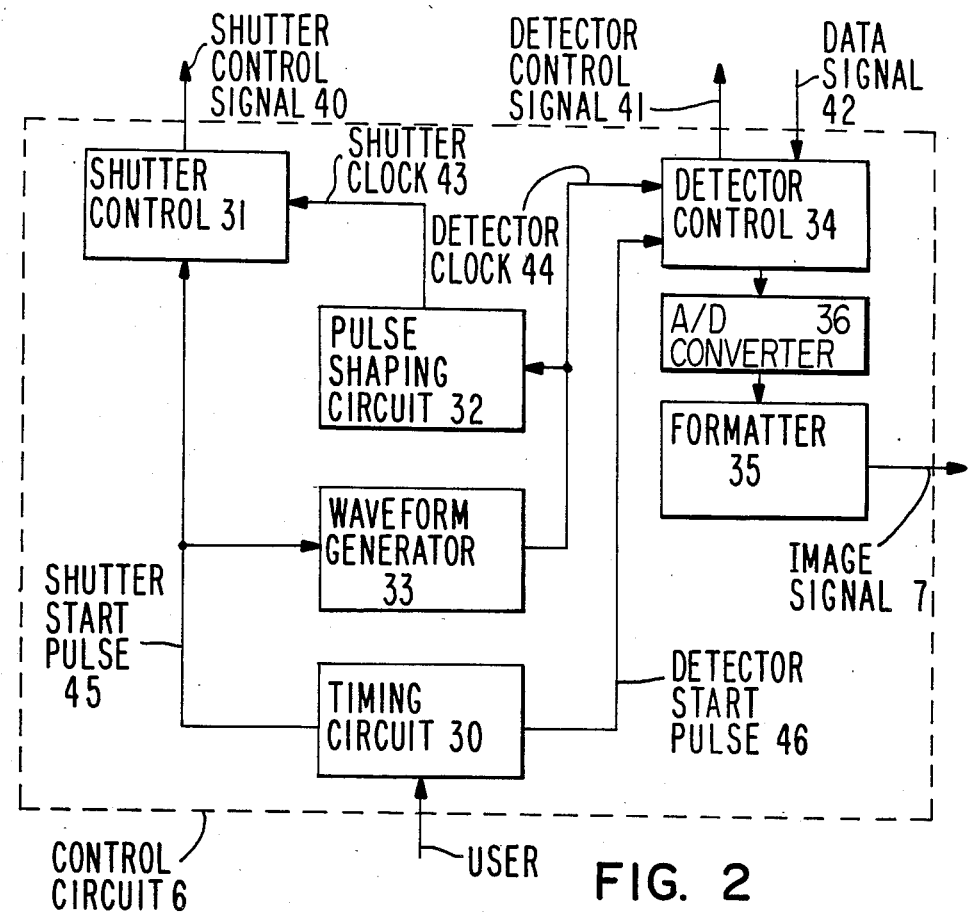
FIG. 2 is a functional block diagram of a suitable control circuit 6.
Figure 3:
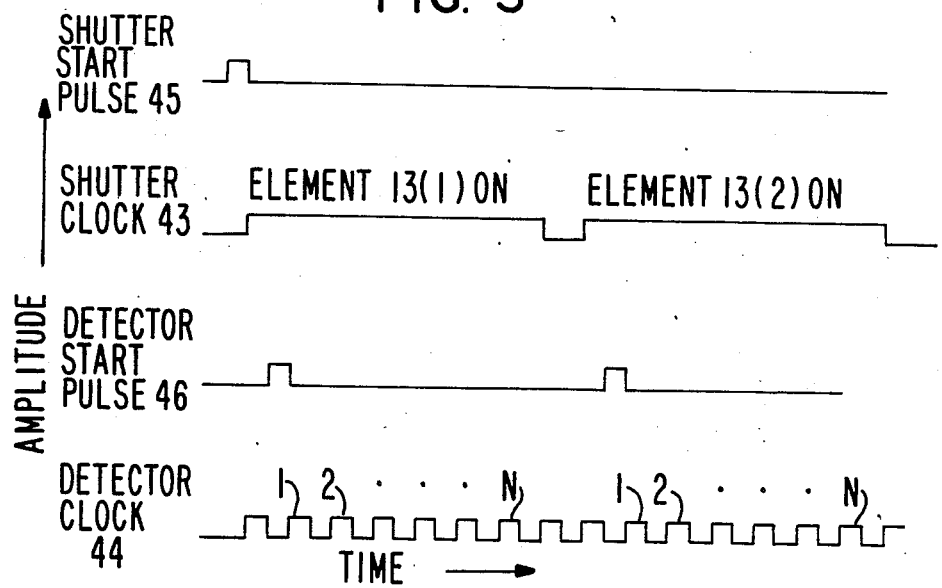
FIG. 3 is a timing diagram associated with the control circuit 6 illustrated in FIG. 2.

One example of a means for implementing control circuit 6 is illustrated in FIGS. 2 and 3. Timing circuit 30 is initiated by the user, once for each image 1 to be electronically converted. This initiation of timing circuit 30 can be automated in synchronism with the mechanical placement of a new image 1 in position to be electronically converted.

Upon initiation, timing circuit 30 produces a shutter start pulse 45 once per image 1. Shutter start pulse 45 is sent to shutter control 31, enabling control circuit 31, and hence allowing modulator 3 to function. After a preselected intentional short delay, which is introduced in order to allow modulator 3 time for initialization, timing circuit 30 produces a first detector start pulse 46. One such detector start pulse 46 is produced for each image line segment 11. Detector start pulse 46 is sent to array control 34, thereby enabling control 34 and allowing array 5 to function.

Shutter start pulse 45 is also sent to waveform generator 33, which generates detector clock 44, a square wave having a relatively high frequency. Detector clock 44 is sent to detector control 34 which, in response thereto, synchronously sequentially polls the N photodetectors 15 via detector control signal 41. Each photodetector 15 can be clocked individually or in groups; if in groups, their output is buffered via buffers within control 34.

The polled photodetectors 15 send their outputs back to detector control 34 via data signal line 42. Said outputs can be analog-to-digitally converted by analog-to-digital converter 36, then processed (e.g., bit packed by formatter 35, which outputs the image signal 7 in digital form. Alternatively, image signal 7 could be used in analog form. If in digital form, image signal 7 may be serial data or parallel data. If parallel data, image signal 7 is conveyed on a bus comprising several wires. Image signal 7 may also be analog data, e.g., in the case of video.

Detector clock 44 is also sent to pulse shaping circuit 32, which generates shutter clock 43 having a lower frequency than detector clock 44. Clock 43 governs the rate at which shutter control 31 synchronously sequentially activates the M shutter elements 13. More than N upticks of detector clock 44 fit within one uptick of shutter clock 43, to allow modulator 3 time for initialization and deinitialization for each image line segment 11. Additional time can be left within a clock 43 uptick for formatting or signal processing by formatter 35. Thus, not every uptick of detector clock 44 results in the polling of a photodetector 15. Those upticks which do cause said polling can be accounted for by a counter within detector control 34. The number of image line segments 11 can be accounted for by a counter within shutter control 31.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An apparatus for converting a two-dimensional image that has been divided into several imaginary image line segments into electronic form, comprising:
   a linear array of photodetectors for converting light received from the image into electronic signals;
   an image lens situated between the image and the array for focusing each image line segment onto the array;
   a light modulator interposed between the image and the image lens for selectively permitting the illumination of the image lens with light received from one of the image line segments; and
   an object lens positioned between the image and the light modulator for focusing the two-dimensional image onto the light modulator.

2. The apparatus of claim 1 wherein the light modulator is a linear array of electro-optic shutter elements positioned orthogonally to the detector array.

3. The apparatus of claim 1 wherein the light modulator is a linear array of LCD elements, said LCD elements corresponding to the image line segments, respectively.

4. The apparatus of claim 1 wherein the light modulator is a linear array of magneto-optic elements, said magneto-optic elements corresponding to the image line segments, respectively.

5. The apparatus of claim 1 wherein the detector array comprises several substantially identical photodetectors from the class of photodetectors comprising photodiodes, phototransistors, and charge coupled devices.

6. The apparatus of claim 5 wherein each photodetector is a photodiode, and coupled to an output of the detector array is an analog-to-digital converter for converting analog electrical signals outputted by the photodiodes into digital form.

7. The apparatus of claim 1 wherein the image resides on a film transparency; and
   said apparatus further comprises a light source for illuminating the film transparency, wherein the film transparency is situated between the light source and the light modulator.

8. The apparatus of claim 1 wherein the image resides on an opaque object having a front side facing the light modulator; and
   said apparatus further comprises a light source for illuminating said front side.

9. The apparatus of claim 1 further comprising a control circuit coupled to the light modulator and to the detector array, said control circuit commanding the light modulator to selectively block the light from all but one of the image line segments, said control circuit further accepting from the detector array electronic signals corresponding to the chosen unblocked image line segment.

10. The apparatus of claim 9 wherein the control circuit comprises:
    a timing circuit which generates first and second pulses that enable the light modulator and the photodetector array, respectively;
    a waveform generator having as an input the first pulse and having as an output a clock which triggers the sequential polling of the photodetectors; and
    a pulse shaping circuit having said clock as an input and having as an output a periodic signal having a frequency lower than that of the clock, said periodic signal controlling the rate at which the light modulator sequentially allows the passage of light from the respective image line segments.

* * * * *